Patented Apr. 21, 1953

2,635,966

UNITED STATES PATENT OFFICE 2,635,966

ASPHALT COMPOSITION

Vanan C. Irvine, Larchmont, N. Y., and Harry J. Sommer, Lafayette, Calif., assignors to Shell Development Company, San Francisco, Calif., a corporation of Delaware No Drawing. Application March 20, 1950, Serial No. 150,824

15 Claims. (Cl. 106—123)

This invention is concerned with bituminous compositions and is more particularly directed to asphalt compositions having substantially improved adhesion characteristics towards aggregates and other solid surfaces.

Asphalt, tars and other bituminous materials are commonly used for the preparation of roads, paved surfaces and the like. When these bituminous materials are employed for coating dry solids, rocks, sand, etc. little difficulty is found in causing complete coverage of the solid surfaces. However, when the solid is moist or wet it often becomes difficult to obtain a satisfactory bond between an aggregate and bituminous substances such as asphalt. When a solid has been coated with asphalt and is subsequently exposed to water or weathering, it often happens that water displaces the asphalt from the solid and may strip it completely.

A number of materials have been incorporated in bituminous compositions to improve their resistance to disintegration by moisture or weathering. For the most part the additives which have been used have been only partially successful and their effect has been found to be more or less temporary. For example, acidic additives such as oleophilic acids improve the adhesion of certain asphalt to basic aggregates such as limestone. Various amines and amides have been used for similar purposes but their effect is largely confined to compositions where acidic aggregates such as granite predominate. Numerous variations in the structure of amines and their reaction products have been investigated. One of the more commonly employed at the present time is an amido amine salt of a higher fatty acid. However, the greatest shortcoming which most of these additives exhibit is their tendency to lose their adhesion effect, especially when the asphalt or asphalt composition containing them is subjected to extended periods of heating. This is an extremely serious shortcoming since most asphalts are shipped from the refinery to a construction site in heated tank cars or are heated at least immediately prior to their use in construction projects such as roads and similar structures.

An ideal asphalt additive should possess several characteristics. In the first place the additive should be effective in improving the adhesion of asphalt to aggregate both in the dry condition and when wet. Secondly, the additive should be stable to the influence of periods of heating such as may be expected prior to, during or subsequent to application of the asphalt to an aggregate. In the third place, the additive should be effective not only on a single type of mineral aggregate but on the various types commonly employed for road laying purposes and the like. In addition to all of these prerequisites, any advantageous properties which a particular additive possesses would be more or less immaterial if the additive were too expensive to be used in low cost compositions such as roads and similar surfaces.

It is an object of this invention to improve the adhesion of bituminous materials to solids. It is another objective of this invention to provide a relatively universal adhesion agent for bituminous substances. More particularly, it is an object of this invention to provide an improved adhesion agent which is highly resistant to thermal influences and to abnormal weather and mechanical stress conditions. Finally, it is a primary object of the present invention to provide a universally effective adhesion agent which is more economical to produce than most of the materials commercially employed at the present time. Other objects will become apparent in the following discussion.

Now in accordance with this invention it has been found that the adhesion characteristics of asphalt are substantially improved by the addition thereto of certain partial amides of hydroxyalkylene polyamines. More specifically, it has been determined that adhesion characteristics of asphalts are substantially improved by the addition of partial amides formed by interaction of the high molecular weight carboxylic acids and hydroxy containing polyamines, such as the condensation products of monohaloepoxyalkanes and amino substances such as ammonia or aliphatic amines. A particularly preferred species of this class comprises amides of the condensation product of epichlorohydrin and ammonia wherein between about 20% and about 40% of the nitrogen atoms of said condensation product are in amide form with the acid. Adhesion agents of this class have been found to be highly effective on both basic and acidic aggregates. Moreover, they retain their adhesion characteristics to a large extent even though asphalt containing them is subjected to extended heating periods. At the present time the starting materials for the production of these adhesion agents are extremely low in price resulting in an additive having commercial application where many other additives can not be employed due to their cost.

The term "bituminous substances" is meant to include those materials containing asphaltenes and tarry constituents. These include natural asphalts such as Trinidad asphalt, asphaltites such as gilsonite, pyrogenous distillates, petroleum tars, coal tars, wood tars and especially the pyrogenous residues such as residual asphalts, blown bituminous asphalts and similar materials.

The solids towards which the subject adhesion agents are responsive include "acidic" aggregates such as granite, quartz, feldspar and rhyolite, as well as the basic aggregates of the limestone type. The asphalts should contain from about 0.1% to about 3% by weight based on the asphalt of the partial amides especially described hereinafter. In most instances the effective amount of the adhesion agent is between 0.5% and about 1.5% by weight based on the asphalt.

The preparation of the improving agents of this invention is exemplified by the condensation of ammonia or primary or secondary amines with a suitable polyfunctional halohydrin, such as monohalodihydroxy-compounds, including their epoxy derivatives, such as epihalohydrins, and dihalo-monohydroxy-compounds. The simplest poly amino hydroxy reaction products thus obtainable, and preferably polymeric products thereof, are reacted with highly oleophilic organic compounds reactive therewith, particularly with the amino groups, such as various organic acylating compounds, and particularly the fatty acids. The amino (NH) reactant which is condensed with the halohydrin preferably is ammonia or an amine which contains a hydrocarbyl (preferably aliphatic) radical(s) or other organic substituent radical having not more than 20 carbon atoms per radical, preferably not more than 10. These include the primary aliphatic amines such as methylamine, ethylamine, up to dodecylamine, the secondary aliphatic amines such as dimethylamine, methyl ethylamine, dipropylamine, dihexylamine, and the like, the polyamines such as ethylene diamine, propylene diamine, tetraethylene pentamine, and the like, as well as the amines which contain various substituent polar groups. In general, the amino reactant should have a molecular weight which is not greater than about 250, while it is preferred to use those which have molecular weights no greater than about 150, including any substituent groups therein.

While the condensation products formed from epichlorohydrin, in accordance with the invention, are preferred, the general class of monohaloepoxyalkanes has been found to be particularly suitable for use in the invention, and especially when the amine condensation products thereof are acylated with fatty acids having at least 12 carbon atoms per molecule. Preferably the haloepoxyalkanes should have no more than 10 carbon atoms in the molecule, and typically suitable representative species of these include:

Epichlorohydrin (1,2-epoxy-3-chloropropane)
2,3-epoxy-4-chlorobutane
1,2-epoxy-3-isopropyl-3-iodopropane
1,2-epoxy-4-chlorobutane
1,2-epoxy-5-chloropentane
1,2-epoxy-3-methyl-3-chloropropane
1,2-epoxy-3,3-dimethyl-3-chloropropane
1,2-epoxy-2-methyl-3-bromopropane
2,3-epoxy-4-methyl-1-chlorohexane
1,2-epoxy-4-methyl-5-bromopentane The amine-halohydrin condensation products of the invention are generally formed by interaction of the amine (or ammonia) with the halohydrin under suitable reacting conditions, which may be below normal ambient room temperature or at an elevated temperature, depending on the reactivities of the particular substances involved. The initial condensation product may be caused to condense further or to polymerize, generally by maintaining it at the initial reaction condition for an extended period of time and/or by heating the material to a still higher temperature. The condensation product may then be converted to more oleophilic materials, if desired, by causing it to react with an oleophilic compound which is reactive therewith, such as an organic acid containing an oleophilic radical. In view of the many variable factors involved in the preparation of the agents of the invention, the influences of which on the selection of specific conditions for the preparation of particular agents will be readily understood from the description herein, the preparation of the products will be described with respect to a specifically illustrative preparation from preferred materials. It will be understood that the operations described and the conditions employed may be utilized to a large degree in the preparation of analogous compounds from other combinations of reactants which have already been indicated.

In a preferred embodiment of the invention, epichlorohydrin is added dropwise or at least in small incremental portions to concentrated aqueous or alcoholic ammonia at a temperature between about 20° C. and about 60° C., and preferably at a temperature of from about 30° C. to about 50° C., optimum control of the reaction being obtained at about 40° C. The time of addition of the epichlorohydrin to the ammonia and the subsequent period of heating may be from about 10 minutes to about four hours or more. It has been found that a period of about 20 minutes for incorporation of the ingredients followed by an hour of heating usually results in complete reaction. An excess of ammonia, over that required to react with any halogen present and any epoxy groups, is usually employed, a ratio of ammonia to halohydrin of from about 4:1 to 20:1 generally being employed. When the ratio is between 5:1 and 10:1, complete reaction of the epichlorohydrin appears to take place under the conditions described above. Following addition of the reactants and subsequent heating, the excess of ammonia is removed, usually by volatilization.

Since the halogen of the halohydrin is converted, for the most part, to halide ion (such as in ammonium chloride) and since the presence of such ion or equivalent salt is usually not to be desired in the finished product, it is removed by any suitable means. A suitable method is to heat the reaction mixture with a strong inorganic base such as sodium hydroxide in an amount equivalent to the chloride present, thereby replacing the ammonia (from the ammonium chloride) which is removed by volatilization, and forming sodium chloride, which is preferably separated from the hot fluid mass by centrifuging, filtering, or the like, either at this time or after any subsequent acylation. The reaction mixture is then heated to a temperature between about 100° C. and 170° C., or until all of the water or alcohol present has been evaporated. Lower temperatures may be used as reduced pressures are employed for this dehydrating step.

The condensation product thus obtained is a water-soluble solid, translucent white in appearance, which changes to a straw-colored (yelloworange) tacky fluid mass when heated to a temperature of about 140° C. Characterizing examinations of the product indicate it to be a complex mixture containing from about 5 to 25% of 1,3-diamino-2-hydroxypropane, with the remainder being largely dimeric and trimeric products equivalent to these polymers obtainable by condensation of 1,3 - diamino - 2 - hydroxypropane. The dimers appear to predominate when a high ratio of ammonia to epichlorohydrin is used, while a larger proportion of trimers are produced when lower ratios of ammonia to epichlorohydrin are used.

The polymeric portion of the product of the condensation of ammonia and epichlorohydrin appears to be a mixture of secondary and tertiary amino compounds having for the most part units of the following configuration:

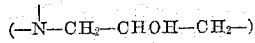

Thus, the dimer is

i. e.,

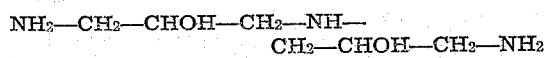

containing both primary and secondary amino groups, while the trimers are probably linear, including cyclic and cross-linked polymers, the open-chain linear trimer molecules containing only primary and secondary amino groups, the closed ring linear trimer molecules containing only secondary amino groups, and the cross-linked trimers containing only primary and tertiary amino nitrogens, thus:

    open-chain linear trimer
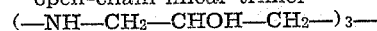
    closed ring linear trimer
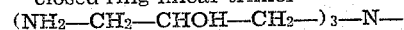
    cross-linked trimer The polymeric product also contains a smaller proportion of corresponding molecules having units of the isomeric configuration:

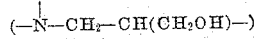

wherein the alcoholic hydroxyl group is a primary alcohol instead of a secondary alcohol and one of the amino nitrogens is attached to a secondary carbon atom instead of to a primary carbon atom. Additionally, it is considered that at least a significant proportion of the polymeric product is made up of oxy-ether molecules corresponding to those obtainable from condensation of the monomer through the alcoholic hydroxyl group, with or without condensation through amino groups, thus forming polyamino oxy compounds in which a portion or all of the oxy oxygen is present as ether-oxygen, i. e., as alkoxy-oxygen. While it is considered that this general description of the product is correct, the exact configurations of the polymeric constituent molecules of the mixture have not been definitely determined. The different products before amide formation vary from a thick liquid to a hard resin-like substance. In general, it is desirable to utilize products which, at least prior to application to the hydrophilic inorganic solid, have molecular weights not greater than about 1000. As a result of heat treatment applied after application of the improving agent to the inorganic solid, separately or in contact with the oleophilic base material, the improving agent may be further polymerized to give products with much higher molecular weights.

The ammonia-epichlorohydrin condensation product, either before or after separation therefrom of the sodium chloride or removal of all the water, is mixed with a higher fatty acid, or mixtures thereof, such as by mixing with tallow fatty acids or with acids derived from animal or vegetable oils or by the partial oxidation of hydrocarbon mixtures such as various petroleum fractions, and the mixture is heated at a temperature from about 150° C. to about 225° C. for a period of from about 15 minutes to about two hours, or longer if desired, whereby the ammonia-epichlorohydrin product is converted to a mixture of salt and amide. For use in the present invention, sufficient acid may be employed to react in the formation of amides from all of the primary or secondary amino groups present or to form salts with the tertiary amino groups, but it is preferred to form amides of the oleophilic acid with between about 20% and 40% of the amino nitrogen atoms present in the condensation product. Further preferred, the salt proportion should also be between 40% and 70% of the nitrogen atoms. Hence, the free amino groups preferably are between 0% and 40%.

It will be understood, however, that in the case of condensation products formed from amines and halohydrins selected to give products containing a substantial proportion of oleophilic groups, which products will be substantially oil-soluble, it will not be necessary to acylate or amidate the condensation product in order to provide the necessary oleophilic characteristic required for utility in the invention. Following the amide formation, which occurs during the indicated heating period with the acid, the hot fluid condensation amide may be decanted from any inorganic salt present. If a more refined product is desired, a solvent may be added in order to thin the mixture following which salt may be removed by decantation, filtration or centrifugation. The amides are usually hard, waxy, yellowish solids with softening points generally between 160° F. and 250° F. The tall oil fatty acid amide appears to be a sticky gel which is exceptionally sticky at room temperature.

In accordance with the invention, the intermediate condensation product, prepared as above, is treated with an organic acid or a suitable derivative of an organic acid to convert at least a portion of the amino groups of the intermediate product into amido groups. In some cases, the acylation reaction can be carried out between the polymeric oxygen-containing amine and the selected acid per se, while in other cases, suitable derivatives of the acids, such as an acid anhydride, an acid choride, or an ester of the acid, may be employed.

The products of the invention are advantageously represented by those N-acyl-substituted polymeric oxygen-containing amines wherein the N-acyl groups are the acyl groups of carboxylic acids. Representatives of such carboxylic acids are the fatty acids and other fat acids, especially those containing eight or more carbon atoms, naphthenic acids, especially those of petroleum origin, wax acids (produced by incomplete oxidation of petroleum or like wax), resin acids of either plant or animal origin, rosin acids and chemically modified rosin acids, and artificial or natural mixtures containing such carboxylic acids, e. g., tall oil, refined tall oil, red oil, and crude acids obtained by saponification of natural glyceride oils, such as peanut, rape, palm, whale, tung, cocoanut, linseed, corn, cottonseed, fish, or other oil, tallow, or the like. The preferred products contain the acyl groups of carboxylic acids having molecular weights upwards from about 130, and preferably within the range of from about 150 to about 500. Especially preferred products are obtained when the acyl groups are the acyl groups of aliphatic monocarboxylic acids containing from 12 to 20 carbon atoms. Representative of such aliphatic monocarboxylic acids are oleic, stearic, lauric, palmitic, myristic, arachidic, ricinoleic, petroselinic, vaccenic, linolenic, linoleic, eleostearic, licanic, parinaric, tariric, godoleic, arachidonic, palmitoleic, hydnocarpic, chaulmoogric, gorlic, and like fatty acids. The N-acyl groups may be the same or they may be different.

Example I

A condensation product was prepared by reacting 10 mols of ammonia with 1 mole of epichlorohydrin at a temperature of about 40° C. for a period of 30 minutes. The reaction mixture was then heated with sodium hydroxide to convert all the chloride present in the reaction mixture to sodium chloride which was then separated from the product by centrifuging. The reaction mixture was then heated to a temperature of about 110° C. to remove the volatile constituents and to produce the condensation product. A typical product had a molecular weight of 105 and contained 43.1% carbon, 9.5% hydrogen and 21.2% nitrogen, the balance being oxygen and a small amount of impurities and had an equivalent weight of about 38 as a base. The condensation product was then heated at a temperature of 175–200° C. for a period of 1 hour with a mixture of tallow oil acids. These tallow oil acids are a mixture comprising primarily stearic, palmitic and oleic acids. Sufficient acid was employed to neutralize about ⅓ of the amino groups present in the condensation product. 1% by weight of this partial salt-amide mixture was incorporated in a San Joaquin Valley medium curing asphalt cutback. The modified asphalt was employed to coat soda rhyolite aggregate which had been wet with 2% by weight of water. The asphaltic cutback was heated to 212° F. and applied to aggregate (which had a temperature of 77° F.), 6% of the cutback being used. The coated aggregate was cured for one hour at 77° F. and then was soaked for 20 hours in distilled water at the same temperature. A visual inspection of the aggregate was made in order to estimate the percent of the surface which remained coated with asphalt. Comparable samples were prepared containing no additive and containing 0.5% of the additive. In determining the thermal stability of these additives asphalt containing them was heated for 7 days at 275° F. and then used for coating aggregate as described above. The data obtained by these experiments are presented in Table 1.

TABLE 1

| Additive, Wt. Percent | Percent Coating Retained Soda Rhyolite (Oakland, Calif.) | |
|---|---|---|
| | No heating | After heating 7 days at 275° F. |
| 0.5 | 100 | 80 |
| 1.0 | 100 | 90 |
| None | 10 | 0 |

Example II

The above tests were repeated using crystalline limestone as the aggregate. Table 2 presents the data obtained.

TABLE 2

| Additive, Wt. Percent | Percent Coating Retained Crystalline Limestone (Shingle Spring, Calif.) | |
|---|---|---|
| | No heating | After heating 7 days at 275° F. |
| 1.0 | 90 | 80 |
| None | 10 | 10 |

Example III

The condensation product obtained as described in Example I was heated with refined tall oil acids to produce a series of partial amides and amine salts having a varying proportion of the nitrogen atoms in amide and salt form. Asphalts containing 1% by weight of these amides were tested for their thermal stability adhesion characteristics. Table 3 presents the data showing that maximum results are obtained when limestone aggregate is coated with asphalt containing a partial amide having 86% of the nitrogen atoms in salt and amide form.

TABLE 3

| Percent Total Nitrogen Present | | | Limestone—Percent Coating Retained After Heating 7 Days at 275° F. |
|---|---|---|---|
| Amide | Amine Salt | Free Amine Form | |
| 50 | 0 | 50 | 20 |
| 28.4 | 58.4 | 13.2 | 95 |
| 28.4 | 71.6 | ¹0 | 60 |

¹ 0.086 eq./100 gr. free fatty acid.

Example IV

The tests described in Example III were repeated with a soda rhyolite aggregate. It will be noted from Table 4 that maximum results are obtained when the salt and amide constitute 86.8% of the total nitrogen content.

TABLE 4

| Percent Total Nitrogen Present | | | Soda Rhyolite—Percent Coating Retained After Heating 7 Days at 275° F. |
|---|---|---|---|
| Amide | Amine Salt | Free Amine | |
| 50 | 0 | 50 | 40 |
| 28.4 | 58.4 | 13.2 | 100 |
| 28.4 | 71.6 | ¹0 | 40 |

¹ 0.086 eq./100 gr. free fatty acid.

Example V

When the condensation product obtained as described in Example I is heated with petroleum naphthenic acids, a partial amide is obtained which has effective adhesion properties in asphalt compositions.

Example VI

When ethylene diamine is condensed with epichlorohydrin and then reacted with oleic acid to form a partial amide, the resulting product is thermally stable and possesses outstanding adhesion characteristics.

Example VII

Methylamine is condensed with epichlorohydrin to produce a reaction product which is then heated with stearic acid to form a partial amide exhibiting high thermal stability and adhesion characteristics when added to asphalt.

Example VIII

When diethylamine is condensed with epichlorohydrin, the reaction product so formed can be heated with tall oil acids to produce a partial amide useful as an asphalt adhesion.

The invention claimed is:

1. An asphalt composition comprising a major amount of asphalt having dispersed therethrough from about 0.5% to about 1.5% by weight, based on the asphalt, of an amide formed between a fatty acid having 12-24 carbon atoms and part of the nitrogen atoms of a condensation product of a monohaloepoxyalkane having no more than 10 carbon atoms per molecule and ammonia, between 20 and 40% of the nitrogen atoms of said partial amide being in amide form, between 40% and 70% of the nitrogen atoms being in salt form, and any remaining nitrogen atoms being in free amine form, said condensation product having been formed by heating a mixture of 1 mol of monohaloepoxyalkane and between about 5 and about 10 mols of ammonia at a temperature between about 30° C. and about 50° C., for a period of time of between about 10 minutes and about 4 hours.

2. An asphalt composition comprising a major amount of asphalt and from about 0.5% to about 1.5% by weight, based on the asphalt, of an amide formed between a fatty acid having between about 12 and 24 carbon atoms, and part of the nitrogen atoms of a condensation product of a monohaloepoxyalkane having no more than 10 carbon atoms per molecule and ammonia, said condensation product having been formed by heating 1 mol of a monohaloepoxyalkane and from about 5 to about 10 mols of ammonia at a temperature between about 30° C. and about 50° C. for a period of time from about 10 minutes to about 4 hours, and heating the condensation product thus formed with a fatty acid at a temperature between about 150° C. and about 225° C. for a period of time of between about ¼ and 2 hours, whereby a partial amide of said condensation product and fatty acid is formed, said condensation product having from 20% to 40% of its nitrogen atoms in amide form, from 40% to 70% of its nitrogen atoms in salt form and up to 40% of its nitrogen atoms in free amine form.

3. An asphalt composition comprising a major amount of asphalt and from about 0.1% to about 3% by weight based on the asphalt of an amide formed between tall oil acids and part of the nitrogen atoms of a condensation product of epichlorohydrin and ammonia, said condensation product having been formed by heating a mixture having a ratio of from about 4 to about 20 mols of ammonia and 1 mol of epichlorohydrin at a temperature between about 20° C. and about 60° C. for a period of time from about 10 minutes to about 4 hours.

4. An asphalt composition comprising a major amount of asphalt and from about 1% to about 3% by weight based on the asphalt of an amide formed between tallow oil acids and part of the nitrogen atoms of a condensation product of epichlorohydrin and ammonia, said condensation product having been formed by heating a mixture having a ratio of from about 4 to about 20 mols of ammonia and 1 mol of epichlorohydrin at a temperature between about 20° C. and about 60° C. for a period of time from about 10 minutes to about 4 hours.

5. An asphalt composition comprising a major amount of asphalt and from about 0.1% to about 3% by weight based on the asphalt of an amide formed between petroleum naphthenic acids and part of the nitrogen atoms of a condensation product of epichlorohydrin and ammonia, said condensation product having been formed by heating a mixture having a ratio of from about 4 to about 20 mols of ammonia and 1 mol of epichlorohydrin at a temperature between about 20° C. and 60° C. for a period of time from about 10 minutes to about 4 hours.

6. An asphalt composition comprising a major amount of asphalt and from about 0.1% to about 3% by weight based on the asphalt of an amide formed between a higher fatty acid and part of the nitrogen atoms of a condensation product of epichlorohydrin and monomethylamine, said condensation product having been formed by heating a mixture having a ratio of from about 4 to about 20 mols of monomethylamine and 1 mol of epichlorohydrin at a temperature between about 20° C. and 60° C. for a period of time from about 10 minutes to about 4 hours.

7. An asphalt composition comprising a major amount of asphalt and a minor amount sufficient to increase the adhesivity of the asphalt of an amide formed between a higher fatty acid and part of the nitrogen atoms of a condensation product of epichlorohydrin and ammonia, said condensation product having been formed by heating a mixture having a ratio of from about 4 to about 20 mols of ammonia and 1 mol of epichlorohydrin at a temperature between about 20° C. and 60° C. for a period of time from about 10 minutes to about 4 hours.

8. An asphalt composition comprising a major amount of asphalt and a minor amount sufficient to increase the adhesivity of the asphalt of an amide formed between a higher fatty acid and part of the nitrogen atoms of a condensation product of a monochloroepoxyalkane having no more than 10 carbon atoms per molecule and ammonia, said condensation product having been formed by heating from about 4 to about 20 mols of ammonia and 1 mol of monochloroepoxyalkane for a period of time between about 10 minutes and about 4 hours at a temperature between about 20° C. and 60° C.

9. An asphalt composition comprising a major amount of asphalt and a minor amount sufficient to increase the adhesivity of the asphalt of an amide of a high molecular weight non-aromatic carboxylic acid containing only carbon, hydrogen, and oxygen and part of the nitrogen atoms of a condensation product of a monochloroepoxyalkane having no more than 10 carbon atoms per molecule and ammonia, said condensation product having been formed by heating from about 4 to about 20 mols of ammonia and 1 mol of monochloroepoxyalkane for a period of time between about 10 minutes and about 4 hours at a temperature between about 20° C. and 60° C.

10. An asphalt composition comprising a major amount of asphalt and a minor amount sufficient to increase the adhesivity of the asphalt of an amide of a high molecular weight non-aromatic carboxylic acid containing only carbon, hydrogen, and oxygen and part of the nitrogen atoms of a condensation product of a monochloroepoxyalkane having no more than 10 carbon atoms per molecule and a monoalkylamine, said condensation product having been formed by heating a mixture of from about 4 to about 20 mols of said amine and 1 mol of monochloroepoxyalkane at a temperature from about 20° C. to about 60° C. for a period of time between about 10 minutes and about 4 hours.

11. An asphalt composition comprising a major amount of asphalt and a minor amount sufficient to increase the adhesivity of the asphalt of an amide of a high molecular weight non-aromatic carboxylic acid containing only carbon, hydrogen, and oxygen and part of the nitrogen atoms of a condensation product of a monochloroepoxyalkane having no more than 10 carbon atoms per molecule and a dialkylamine, said condensation product having been formed by heating a mixture of from about 4 to about 20 mols of said amine and 1 mol of monochloroepoxyalkane at a temperature from about 20° C. to about 60° C. for a period of time between about 10 minutes and about 4 hours.

12. An asphalt composition comprising a major amount of asphalt and from about 0.5% to about 1.5% by weight based on the asphalt of an amide formed between a non-aromatic carboxylic acid containing only carbon, hydrogen, and oxygen having at least 12 carbon atoms per molecule and part of the nitrogen atoms of a condensation product of a monohaloepoxyalkane having no more than 10 carbon atoms per molecule and a nitrogen base of the group consisting of ammonia, monoalkylamines and dialkylamines, between about 20% and about 40% of the nitrogen atoms of said condensation product being in amide form with said acid, the condensation product having been formed by heating a mixture of from about 4 to about 20 mols of said nitrogen base and 1 mol of monohaloepoxyalkane at a temperature between about 20° C. and about 60° C. for a period of time between about 10 minutes and about 4 hours.

13. An asphalt composition comprising a major amount of asphalt and a minor amount sufficient to improve the adhesivity of the asphalt of an amide formed between a high molecular weight non-aromatic carboxylic acid containing only carbon, hydrogen, and oxygen and part of the nitrogen atoms of a condensation product of a monohaloepoxyalkane having no more than 10 carbon atoms per molecule and a nitrogen base of the group consisting of ammonia, monoalkylamines and dialkylamines, said condensation product having been formed by heating a mixture of from about 4 to about 20 mols of said nitrogen base and 1 mol of monohaloepoxyalkane at a temperature between about 20° C. and about 60° C. for a period of time between about 10 minutes and about 4 hours.

14. An asphalt composition comprising a major amount of asphalt and a minor amount sufficient to increase the adhesivity of the asphalt of an amide formed between a higher fatty acid and part of the nitrogen atoms of a condensation product of a monohaloepoxyalkane having no more than 10 carbon atoms per molecule and ammonia, said condensation product having been formed by heating from about 4 to about 20 mols of ammonia for each mol of monohaloepoxyalkane at a temperature between about 20° C. and about 60° C. for a period of time between about 10 minutes and about 4 hours.

15. An asphalt composition comprising a major amount of asphalt and from about 0.5% to about 1.5% based on the asphalt of an amide formed between an aliphatic carboxylic acid having from 12 to 24 cabon atoms per molecule and part of the nitrogen atoms of a condensation product of a monohaloepoxyalkane having no more than 10 carbon atoms per molecule and ammonia, between 20% and 40% of the nitrogen atoms being in amide form, between 40% and 70% of the nitrogen atoms being in salt form and any remaining nitrogen atoms in free amine form, said condensation product having been formed by heating a ratio of from about 4 to about 20 mols of ammonia and 1 mol of monohaloepoxyalkane at a temperature between about 20° C. and about 60° C. for a period of time from about 10 minutes to about 4 hours.

VANAN C. IRVINE.
HARRY J. SOMMER.

References Cited in the file of this patent
UNITED STATES PATENTS

| Number | Name | Date |
|---|---|---|
| 2,191,295 | Dohse et al. | Feb. 20, 1940 |
| 2,317,959 | Johnson et al. | Apr. 27, 1943 |
| 2,419,404 | Johnson | Apr. 22, 1947 |